United States Patent [19]

Jones

[11] 4,080,934
[45] Mar. 28, 1978

[54] ROTARY ENGINE WITH INSERTS IN ROTOR FACES

[75] Inventor: Charles Jones, Hillsdale, N.J.

[73] Assignee: Curtiss-Wright Corporation, Wood-Ridge, N.J.

[21] Appl. No.: 721,674

[22] Filed: Sep. 9, 1976

[51] Int. Cl.² .............................................. F02B 55/14
[52] U.S. Cl. .................................................. 123/205
[58] Field of Search ..................... 418/61 A, 178, 179; 123/8.01, 8.09, 8.11, 8.13

[56] References Cited

U.S. PATENT DOCUMENTS

| 3,655,302 | 4/1972 | Hermes et al. | 418/61 A |
| 3,799,709 | 3/1974 | Reitz et al. | 418/91 |
| 3,995,602 | 12/1976 | Burley | 418/178 X |

FOREIGN PATENT DOCUMENTS

| 1,817,099 | 9/1970 | Germany | 123/8.09 |
| 964,131 | 7/1964 | United Kingdom | 123/8.11 |

Primary Examiner—C. J. Husar
Assistant Examiner—Leonard Smith
Attorney, Agent, or Firm—Victor D. Behn; Arthur Frederick

[57] ABSTRACT

A rotary combustion engine in which at least a portion of each of the rotor working surfaces is covered by an insert to raise the operating temperatures of said surfaces.

4 Claims, 6 Drawing Figures

ROTARY ENGINE WITH INSERTS IN ROTOR FACES

BACKGROUND OF THE INVENTION

The invention relates to rotary combustion engines of the type disclosed in U.S. Pat. No. 2,988,065 granted June 13, 1961 to Wankel et al, and particularly, to such an engine designed for operation as a stratified charge engine, for example, as disclosed in U.S. Pat. No. 3,246,636 granted Apr. 19, 1966 to Bentele and U.S. Pat. No. 3,894,518 granted July 15, 1975 to Gavrun et al.

In such stratified charge engines the fuel discharged by high pressure fuel nozzles strikes the working surfaces of the engine rotor. If the rotor working surfaces are too cool, this results in the formation of heavy carbon deposits on the rotor surfaces as well as the generation of significant smoke in the engine exhaust and increases the hydrocarbons in the engine exhaust. This is particularly true where the interior of the rotor is cooled by a cooling medium such as oil, for example, as disclosed in U.S. Pat. No. 3,176,915 granted Apr. 6, 1965 to Bentele et al.

U.S. Pat. No. 3,359,956 granted Dec. 26, 1967 to Bentele discloses a stratified charge rotary engine in which the rotor working surfaces are provided with a coating of low thermal conductivity so as to increase the temperature of the rotor working surfaces. This serves to decrease the aforementioned carbon deposit build-up on the rotor as well as the smoke and hydrocarbons in the engine exhaust. U.S. Pat. No. 3,359,956 to Bentele, however, has the disadvantage in that the rotor coating tends to chip or flake off, particularly if relatively thick coatings are applied to the rotor to provide a coating of significant insulating properties over the rotor. This flaking is probably the result of thermal shock caused by temperature differences between the inner and outer surfaces of the coating during engine operation.

SUMMARY OF THE INVENTION

Accordingly, an object of this invention is to provide a rotor for a rotary combustion engine with a novel rotor configuration so as to raise the operating temperatures of its working surfaces without the aforementioned disadvantages of Bentele U.S. Pat. No. 3,359,956.

Specifically, in accordance with the invention, each working surface of the rotor is provided with an insert or cover providing an insulating air space between the major portion of the insert and the body of the rotor. With this arrangement, because of said insulating air space, the working surfaces of the rotor run substantially hotter than they would in the absence of said insert and air space configuration thereby helping to vaporize the fuel and insure more complete combustion. Therefore, a further object of the invention is to provide a novel rotor configuration having an insert or cover for at least a major portion of each working face of the rotor so as to leave an insulating air space between each insert and the body of the rotor. Another object of the invention is to support each such rotor insert in such a manner on the rotor as to permit relative thermal expansion and contraction between the insert and the body of the rotor.

A still further object of the invention is to form each of the insert members for the rotor working surfaces with an outwardly facing depression to provide a recess in each working face of the rotor into which fuel is discharged after the charge in each working chamber has been substantially compressed. With this arrangement the relatively hot surface temperatures in the recess of each insert member serves to help vaporize the fuel and minimizes the formation of carbon deposits on the rotor.

Other objects of the invention will become apparent upon reading the following detailed description in connection with the drawings.

DESCRIPTION OF PREFERRED EMBODIMENTS

Figure 2:
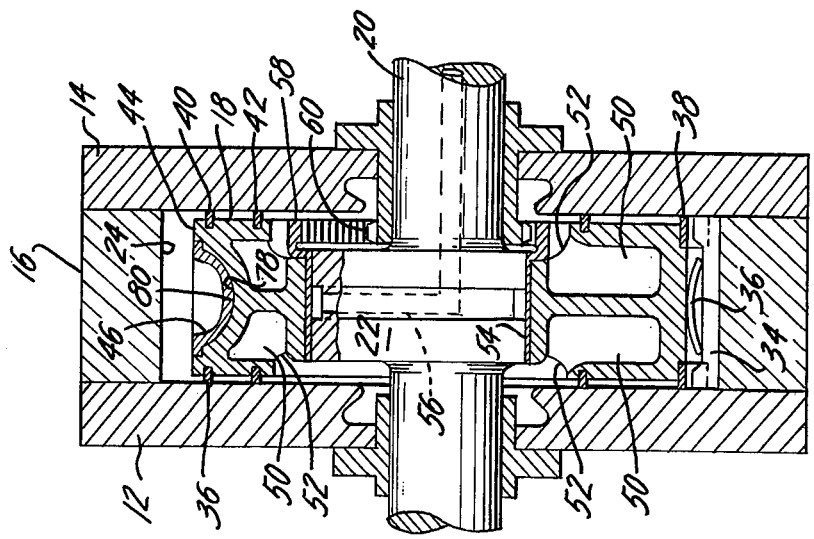
FIG. 2 is a sectional view taken along line 2—2 of FIG. 1.
Figure 1:
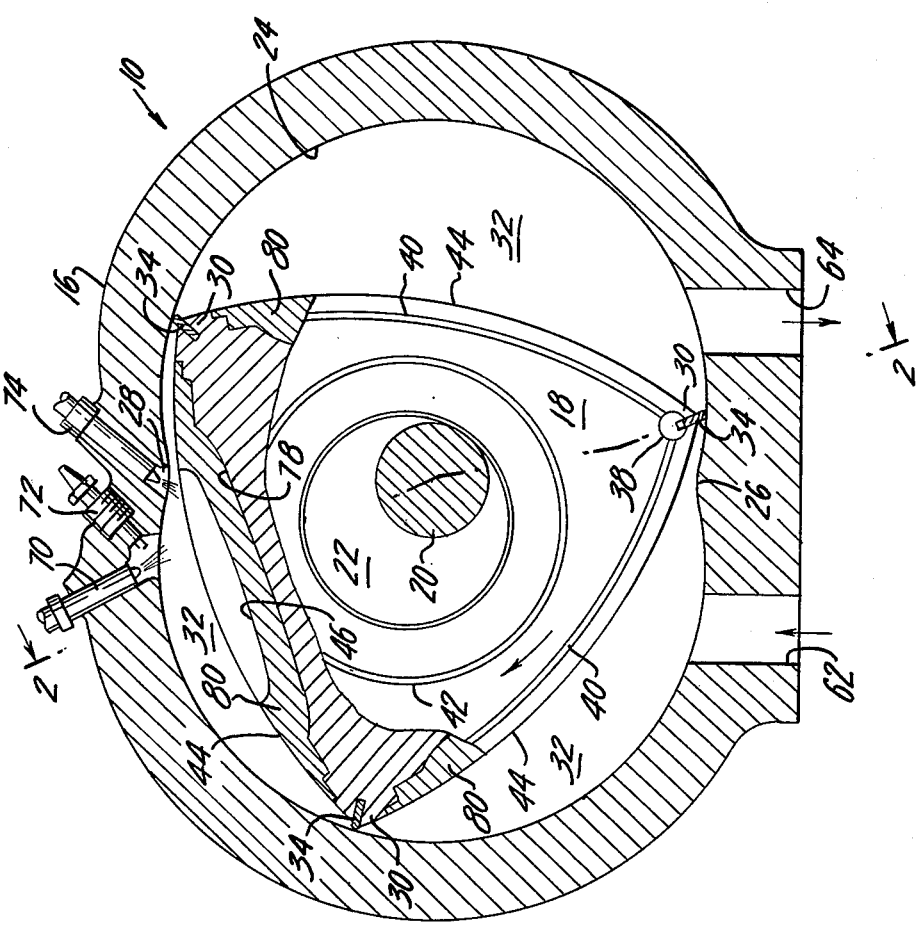
FIG. 1 is a transverse sectional view through a rotor engine embodying the invention.
Figure 3:
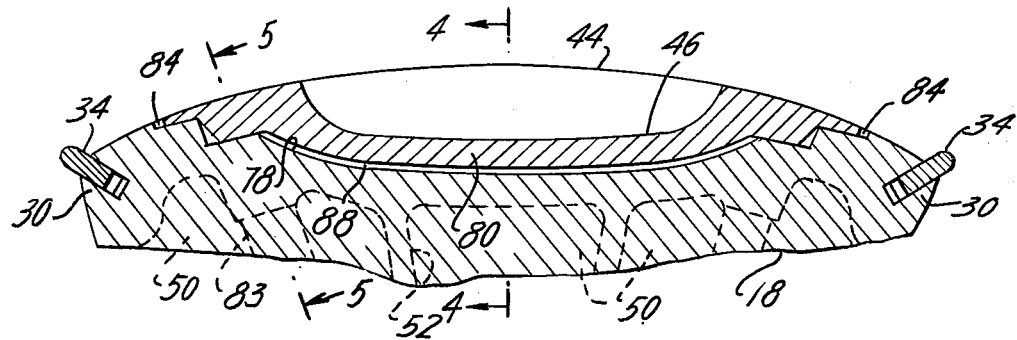
FIG. 3 is an enlarged view of a portion of FIG. 1.

Referring to the drawing, particularly to FIG. 1, a rotary combustion engine is schematically indicated at 10, the engine being generally similar to that described in the aforementioned patents. The engine 10 comprises an outer body or housing consisting of two axially-spaced end housings 12 and 14 and an intermediate or rotor housing 16, these housing parts being secured together to form the engine internal cavity therebetween. An inner body or rotor 18 is journaled for rotation within the housing cavity on an eccentric portion 20 of a shaft 22 which extends coaxially through and is supported by the end housings 12 and 14.

The peripheral inner surface 24 of the intermediate housing 16 is illustrated as having a two-lobe profile which preferably is basically an epitrochoid, said two lobes joining at junctions or regions 26 and 28 disposed relatively near to the engine axis. The rotor 18 has a generally triangular profile with apex portions 30 having sealing cooperation with the trochoid surface 24 to form three working chambers 32 between the rotor and the housing parts 12, 14 and 16. For this purpose, each of the rotor apex portions is provided with a seal 34 which extends across the rotor between the inner walls of the end housings 12 and 14. A spring 36 is provided under each apex seal 34 for urging the seal into sealing contact with the trochoid surface 24. Also, a seal pin 38 is provided at each end of an apex seal strip for sealing engagement with the adjacent housing end wall 12 or 14.

The rotor also has suitable seal strips 40 on its end faces adjacent to the rotor periphery and extending between adjacent apex portions 30 of the rotor for sealing contact with the inner walls of the end housings 12 and 14. Each end face of the rotor 18 also has a suitable annular oil seal 42. Springs (not shown) are provided for urging the seals 40 and 42 into contact with the housing end walls 12 and 14. Each of the three peripheral or working surfaces or faces 44 of the rotor extend between adjacent apex portions 30 of the rotor and preferably have a trough-like recess 46.

The interior of the rotor 18 preferably is divided into circumferentially-spaced compartments 50 by partitions 52 to facilitate cooling of the rotor by circulation of oil or other cooling medium through these compartments, for example, as described in U.S. Pat. No. 3,176,915 granted on Apr. 6, 1965 to Bentele et al. As in the Bentele et al. patent, the oil supplied to the rotor bearing 54 from the shaft passage 56 flows out the ends of this bearing 54 from which the oil is thrown radially outwardly into the rotor compartments 50 by the centrifugal forces on the oil to control the rotor, or oil jets (not shown) may be provided supplying cooling oil to the rotor compartments 50. This oil cooling of the rotor is provided to minimize thermal distortion of the rotor and to protect the rotor bearing 54 and rotor seals from excessive heat.

The engine 10 also includes gears 58 and 60 secured to the rotor 18 and to the engine housing, respectively, to control relative rotation of the rotor. In addition, the engine housing includes an air intake passage 62 disposed adjacent to and on one side of the near-axis region 26 of the trochoid surface 24 and an exhaust passage 64 disposed on the other side of said near-axis region. Combustion is initiated in the engine working chambers adjacent to the other near-axis region 28 of the trochoid surface.

During engine operation and with the rotor rotating clockwise as viewed in FIG. 1, the volume of each working chamber 32 periodically increases from a minimum volume condition, when it is located adjacent to the near-axis region 26 and opens to the intake port 62, to a maximum volume condition and closes to the intake port and then said chamber decreases in volume to compress its intake charge until the chamber again reaches a minimum volume condition, but this time adjacent to the near-axis region 28 at which combustion takes place. Thereafter, the volume of said chamber again increases to a maximum as the combustion gases expand and then decreases to a minimum as the chamber comes into communication with the exhaust port 64 adjacent to the near-axis region 26 to complete its four-stroke cycle. The three working chambers 32 sequentially go through the same cycle.

A fuel nozzle 70 is mounted on the intermediate housing 16 adjacent to the near axis-region 28. The fuel nozzle 70 has its fuel discharge end disposed in a recess opening to the trochoidal surface 24 for discharging fuel into each working chamber 32 after the air intake charge within the chamber has been substantially compressed and combustion is about to be initiated. The fuel nozzle 70 directs at least the major portion of its fuel into the combustion recess or trough 46 of each working chamber 32. A spark plug type igniter 72 is also mounted on the intermediate housing 16 adjacent to the near-axis region 28. The electrodes of the spark plug 72 are disposed adjacent to the discharge end of the nozzle 70 preferably so that the nozzle discharge end and the spark plug electrodes both open through the trochoidal surface 24 through a common recess. In addition, the fuel nozzle 70 and spark plug 72 preferably are disposed so that at least a portion of the fuel vapor produced by the fuel spray discharged by the nozzle passes in close proximity to the spark plug electrodes immediately as the fuel leaves the nozzle 70 for ready ignition by said spark plug.

The engine structure so far described is conventional and is generally similar to that disclosed in the aforementioned patents to Bentele, Bentele et al. and Gavrun et al. In addition, as disclosed in the aforementioned patent to Gavrun et al., a second fuel nozzle 74 preferably is also mounted on the intermediate housing 16 also adjacent to the near-axis region 28 so that this second fuel nozzle is adjacent to the fuel nozzle 70 and spark plug 72. Like the fuel nozzle 70, the second fuel nozzle 74 also directs at least the major portion of its fuel into the combustion recess 46 of each working chamber 32. As described in the Gavrun et al. patent, the flame produced by the burning fuel discharged from the nozzle 70 functions as a pilot flame for igniting the fuel as it discharges from the nozzle 74.

With the structure so far described, particularly because the rotor is oil-cooled, the surface of each combustion recess tends to run cool. For this reason, when fuel is discharged from the fuel nozzle 70 or from the nozzles 70 and 74 into the combustion recess 46 of each working chamber, the fuel does not vaporize readily and instead tends to wet this surface, thereby causing coking on this surface and incomplete combustion of the fuel.

Figure 5:
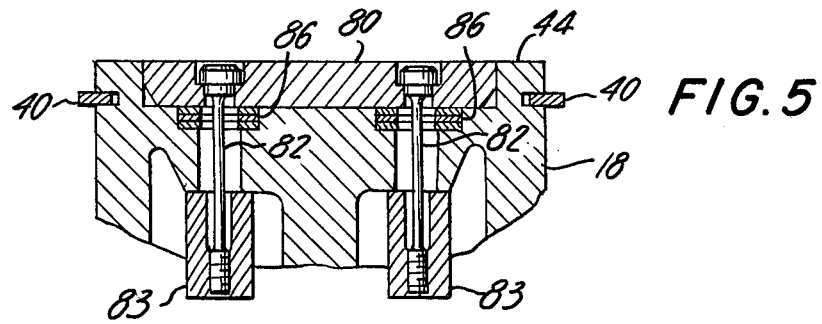

In accordance with the invention, each working face 44 of the rotor 18 is recessed as indicated at 78 to receive an insert member 80 which forms the major portion of the working face 44 of the rotor 18. Each insert member 80 has the combustion recess or trough 46 formed therein. Each insert member extends over the major portion of its working face 44 and is secured to the rotor in such a manner as to permit relative thermal expansion and contraction of the insert member 80 relative to the rotor. For this purpose, each end of the insert member is secured to the rotor by long flexible bolts 82. As shown in FIG. 5, the nuts 83 for the bolts 82 are designed to increase the length of the shank portion of each bolt. Thus, because of the relatively long length of the screws 82, they can laterally flex to accommodate thermal expansion and contraction of the insert member 80 relative to the rotor. Also, for this purpose, a small gap 84 is formed between the ends of each insert member 80 and the rotor to permit such relative expansion and contraction.

Obviously, it is not necessary that both ends of the insert member 80 be flexibly attached to rotor 18 by the flexible attachment shown in FIG. 5. For example, one end of the insert member 80 could be rigidly attached to the rotor with only the other end being flexibly attached as in FIG. 5 to permit relative thermal expansion and contraction of said member relative to the rotor. Also, in order to minimize the contact pressure between the insert member 80 and the rotor 18 at its points of contact and yet permit a high stretch force in each of the bolts 82, a spring, such as a belleville-type washer 86, may be provided between the insert member 80 and the rotor 18 at each screw 82. In this way the contact pressure between the insert member 80 and the rotor 18 is less than the stretch force of each screw 82 by the amount of the compression force of the belleville washer 86.

Figure 4:
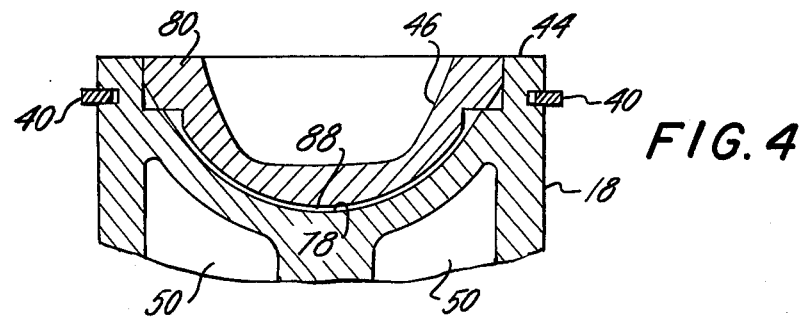
FIGS. 4 and 5 are further enlarged views taken along lines 4—4 and 5—5 respectively of FIG. 3.

In order to thermally insulate each insert member 80 from the rotor 18, a small radial clearance or gap 88 (see FIGS. 4 and 5) is provided between a major portion of the insert member 80 and the rotor, this clearance being disposed over the major portion of the bottom and sides of the insert member 80. The required magnitude of this clearance has been exaggerated in the drawing. It can be quite small and yet be effective to adequately heat insulate the insert member 80 from the body of the rotor 18. For example, in an engine in which rotor apex has a radius of about 5 inches, a clearance 88 of about 0.025 inch has been found to be quite effective. The insert member preferably is made of a material such as steel or titanium having high strength at elevated temperatures and yet being light in weight and, in addition, having a relatively low heat conductivity and preferably having a low thermal expansion.

Since each insert member 80 is thermally insulated by the gap 88 from the rotor 18, during engine operation the insert members 80 run at a substantially higher temperature than that of the rotor 18. This is particularly true where the interior of the rotor is cooled by oil circulation through the rotor compartments as previously described. As a result of the high temperature of each insert member 80, the fuel discharged by the fuel nozzle or nozzles into the recess 46 of said insert member is more readily vaporized thereby improving the combustion efficiency and minimizing coking of carbon on the surface of the rotor.

As illustrated, each insert member 80 terminates short of the adjacent apex portions 30 of the rotor in order that these apex portions and their seals 34 do not operate at excessive temperatures. This is important because if each apex portion 30 of the rotor operated at the high temperatures of the insert members 80, these high temperatures would inhibit adequate lubrication of and low sliding friction between each apex seal 34 and the rotor as well as between each apex seal 34 and the multi-lobe surface 24 of the rotor housing. In this connection, it is noted that each of the rotor apex portions has a chamber 50 directly under the apex portion for circulation of cooling oil through said chamber to keep the temperature of each apex portion 30 of the rotor substantially below that of the insert members 80 during engine operation. Similarly each insert member 80 terminates short of the rotor sides in order that the rotor side seals 40 do not operate at excessive temperatures.

Figure 6:
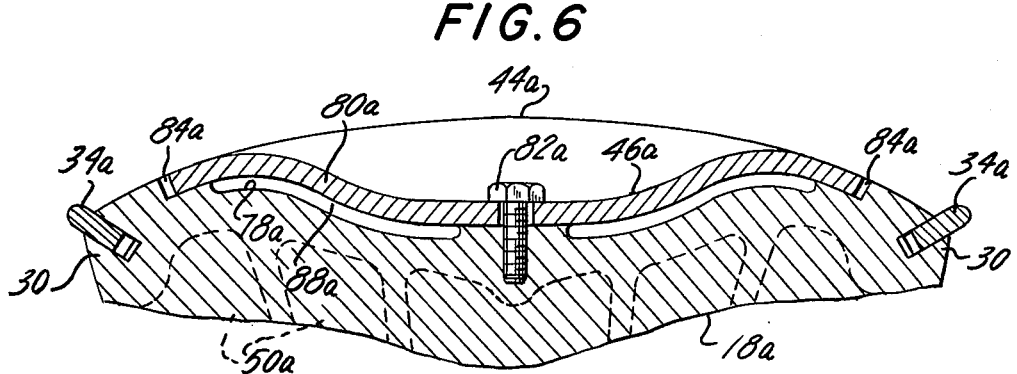
FIG. 6 is a view similar to FIG. 3 but showing a modified form of the invention.

FIG. 6 discloses a modified form of the means for attaching each insert member to the rotor and still permit relative thermal expansion and contraction of each insert member relative to the rotor. For ease of understanding, the parts of FIG. 6 have been designated by the same reference numbers as the corresponding parts of FIGS. 1-5 but with a subscript $a$ added thereto.

The modification of FIG. 6 is similar to that of FIGS. 1-5 except each insert member 46a instead of being secured to the rotor at its ends is secured to the rotor at its mid-section by one or more screws 82a. In this way the two longitudinal ends of each insert member 46a are free to expand and contract relative to the rotor. Also as illustrated in FIG. 6, each insert member can be made of sheet material which, as previously described, may, for example, be steel or titanium.

The invention has been described in connection with two forms of insert members 80 and method of attachment to the rotor 18. It is obvious that other forms of attachment can be provided which will securely attach the insert members to the rotor and yet will permit thermal expansion and contraction of the insert member relative to the rotor and which will provide an adequate heat insulating air gap between a major portion of the insert member and rotor. In each of the insert members 80 and 80a, its combustion recess 46 or 46a respectively is shown as being symmetrically positioned in the midportion of the insert member. However, it is also within the scope of the invention to utilize a non-symmetrical combustion recess and/or to position the recess closer to one end or the other of its associated rotor working face. In addition, although the invention has been described in connection with a rotary engine in which fuel system, e.g., a carburetor for supplying fuel through the engine intake passage. With any fuel system, the higher temperature of the rotor insert members will help vaporize the fuel for more efficient combustion and at the same time the insulating air space between each insert member and the body of the rotor will cause the rotor to operate at lower temperatures and therefore at lower thermal stresses.

It should be understood, therefore, that the invention is not limited to the specific details of construction and arrangement thereof herein illustrated and that changes and modifications may occur to one skilled in the art without departing from the spirit or scope of the invention.

What is claimed is:

1. A rotor for a rotary combustion engine, said rotor comprising:
   (a) a main portion having a generally polygonal profile such that said rotor has a plurality of circumferentially spaced apex portions and a plurality of working surfaces with each working surface of said rotor extending between adjacent apex portions, said rotor main portion having a plurality of internal compartments for the circulation of a cooling medium therethrough with each of the rotor apex portions having one of said compartments disposed adjacent thereto;
   (b) an insert member for each working surface of said rotor with each insert member having a depression between its ends to form a recess in its working face and with each insert member being elongate to extend circumferentially beyond its said recess substantially from one apex portion to the other of its working surface but terminating short of the apex seals of said apex portions to overlie the major portion of said working surface; and
   (c) means securing each insert member to the rotor so as to leave a gap between the major portion of the facing surfaces of said insert and rotor and to permit circumferential thermal expansion and contraction of the major portion of said insert member relative to the rotor.

2. A rotor as claimed in claim 1 in which said securing means includes laterally flexible bolt means securing each circumferential end of each insert member to its working face of the rotor.

3. A rotary combustion engine comprising:
   (a) an outer body having an internal cavity, the peripheral surface of which has a multi-lobe profile with said outer body also having an air intake passage and a combustion gas exhaust passage;
   (b) an inner body of generally polygonal profile mounted for relative rotation within said outer body;
   (c) seal means carried by each apex portion of the inner body for sealing cooperation with said multi-lobe peripheral surface of the outer body to define a plurality of working chambers which vary in volume in response to said relative rotation and each having a working face on the inner body which extends between adjacent apex portions of said inner body with each said working face having a recess between its ends;
   (d) a fuel nozzle mounted on the outer body for disbeing directed into the recess of the associated working face of the inner body;

(e) a plurality of insert members, one for each of the working faces of said inner body, with each insert member having a depression between its ends to form said recess in its working face of the inner body and with each insert member being elongate to extend circumferentially beyond its said recess substantially from one apex portion to the other of its working face but terminating short of the apex seals of said apex portions to overlie the major portion of its working face;

(f) means securing each insert member to the inner body so as to leave a gap between the major portion of the facing surfaces of said insert member and inner body and to permit circumferential thermal expansion and contraction of the major portion of said insert member relative to the inner body; and (g) said inner body having a plurality of internal compartments for the circulation of a cooling medium therethrough with each apex portion of the inner body having one of said compartments disposed adjacent thereto.

4. A rotary combustion engine as claimed in claim 3 in which said securing means includes laterally flexible bolt means securing each circumferential end of said insert member to said inner body.

* * * * *